US012506300B2

(12) United States Patent
Bae et al.

(10) Patent No.: US 12,506,300 B2
(45) Date of Patent: Dec. 23, 2025

(54) CONNECTOR ASSEMBLY

(71) Applicant: KUM LLC, Ulsan (KR)

(72) Inventors: Sang Ho Bae, Ulsan (KR); Young Il Park, Ulsan (KR); Dong Hoon Lee, Ulsan (KR); Young Joo Yun, Ulsan (KR); Jin Su Choi, Ulsan (KR)

(73) Assignee: KUM LLC, Ulsan (KR)

( * ) Notice: Subject to any disclaimer, the term of this patent is extended or adjusted under 35 U.S.C. 154(b) by 357 days.

(21) Appl. No.: 18/129,178

(22) Filed: Mar. 31, 2023

(65) Prior Publication Data

US 2024/0006812 A1 Jan. 4, 2024

(30) Foreign Application Priority Data

Jun. 30, 2022 (KR) ........................ 10-2022-0080896

(51) Int. Cl.

*H01R 13/629* (2006.01)
*H01R 13/631* (2006.01)

(52) U.S. Cl.

CPC ..... *H01R 13/62938* (2013.01); *H01R 13/631* (2013.01)

(58) Field of Classification Search

CPC ............ H01R 13/62938; H01R 13/631; H01R 13/502; H01R 13/193; H01R 13/4538; H01R 13/436; H01R 13/629; H01R 13/639

See application file for complete search history.

(56) References Cited

U.S. PATENT DOCUMENTS

| | | | | |
|---|---|---|---|---|
| 7,404,722 B2 | 7/2008 | Ikeya et al. | | |
| 2008/0102667 A1* | 5/2008 | Ikeya | H01R 13/4538 439/157 |
| 2022/0209469 A1* | 6/2022 | Jung | H01R 13/707 |
| 2024/0006812 A1* | 1/2024 | Bae | H01R 13/631 |

(Continued)

FOREIGN PATENT DOCUMENTS

| | | |
|---|---|---|
| JP | 2008108662 A | 5/2008 |
| KR | 101342165 B1 | 12/2013 |
| KR | 20140008642 A | 1/2014 |

(Continued)

OTHER PUBLICATIONS

English Translation of KR101342165; 10 pages.

(Continued)

*Primary Examiner* — Abdullah A Riyami
*Assistant Examiner* — Nader J Alhawamdeh
(74) *Attorney, Agent, or Firm* — Billion & Armitage

(57) ABSTRACT

A connector assembly has a movable plate for protecting terminals and maintaining alignment in a first connector. The connector assembly includes a first connector having a coupling space formed therein and having a plurality of first terminals disposed in the coupling space, a moving plate movably installed in the coupling space and having a terminal hole through which the first terminal passes, and a second connector coupled to one side of the first connector and moving the moving plate in the coupling space. A step portion is formed on the inner surface of the first connector. A hinge portion is formed on a side surface of the moving plate to rotate at a predetermined angle, and an end of the hinge portion can be locked or released from the step portion.

8 Claims, 11 Drawing Sheets

(56) References Cited

U.S. PATENT DOCUMENTS

2024/0347969 A1 * 10/2024 Bae .......................... H01R 13/50

FOREIGN PATENT DOCUMENTS

KR 101862851 B1 5/2018
KR 101899841 B1 * 9/2018

OTHER PUBLICATIONS

"Extended European Search Report"; European Patent Office; mailed on Nov. 6, 2023; 13 Pages.
"Machine Translation of Office Action for Application No. 10-2022-0080896 mailed on Jun. 20, 2024, 6 pages".
"Office Action for Application No. 10-2022-0080896; Korean Intellectual Property Office; mailed on Jun. 20, 2024", 17 Pages.

* cited by examiner

CONNECTOR ASSEMBLY

CROSS-REFERENCE TO RELATED APPLICATION

This application claims benefit of priority to Korean Patent Application No. 10-2022-0080896 filed on Jun. 30, 2022, the entire disclosure of which is hereby incorporated by reference.

TECHNICAL FIELD OF THE INVENTION

The present invention relates to a connector assembly having a moving plate protecting terminals and maintaining an alignment state thereof within a first connector.

BACKGROUND

In general, a connector is a connection mechanism that electrically connects a power source and a device, a device and a device, and an internal unit of a device. For example, a first connector and a second connector are formed to be coupled to each other to define a connector assembly. A plurality of terminals for transmitting current and signals may be provided and aligned inside the first connector and the second connector.

As the performance of devices improves and functions thereof increase, currents and signals transmitted through connectors increase, and as a result, the number of terminals provided in connectors also increases. Accordingly, the terminals may become thin and elongated, and as the terminals become thin and elongated, there is a risk that the terminals may be damaged during the coupling process.

In order to solve this problem, a moving plate capable of performing functions such as protecting terminals while maintaining an alignment state thereof, and preventing inflow of foreign substances prior to the coupling, is installed inside the connector.

However, since such a moving plate is added, a series of interlocking structures or parts related to the operation of the moving plate are additionally required in the connector or connector assembly, and thus the configuration of the connector assembly is inevitably complicated.

Moreover, for example, in the case in which the moving plate is temporarily coupled to the first connector, the moving plate may be easily damaged in a temporarily coupled state by undesired external force applied to the first connector, and as a result, the moving plate cannot reliably protect and hold the terminals.

SUMMARY

An object of the present invention is to provide a connector assembly that can be simply configured without separate parts and can reliably maintain a moving plate in a temporary coupling position when undesired external force is applied.

A connector assembly according to an embodiment of the present invention includes a first connector having a coupling space formed therein and having a plurality of first terminals disposed in the coupling space; a moving plate movably installed in the coupling space and having a terminal hole through which the first terminal passes; and a second connector coupled to one side of the first connector and moving the moving plate in the coupling space, wherein a step portion is formed on the inner surface of the first connector, and wherein a hinge portion is formed on a side surface of the moving plate to rotate at a predetermined angle, and an end of the hinge portion is locked or released from the step portion.

The second connector includes a second housing having an accommodating space formed therein, a plurality of second terminals inserted into the second housing, and a holder coupled to the second housing in the accommodating space and having a terminal hole through which the second terminal passes, wherein a push plate extending in the thickness direction of the holder is formed on one side of the holder, and wherein when the first connector and the second connector are coupled, a free end of the push plate comes into contact with the hinge portion to rotate the hinge portion.

According to an embodiment of the present invention, the connector assembly can be simply configured without separate parts for the operation of the moving plate, and when undesired external force is applied, the moving plate can be reliably maintained in a temporary coupling position.

BRIEF DESCRIPTION OF THE DRAWINGS

The present invention is now described, by way of example with reference to the accompanying drawings, in which.

DETAILED DESCRIPTION

Figure 1A:
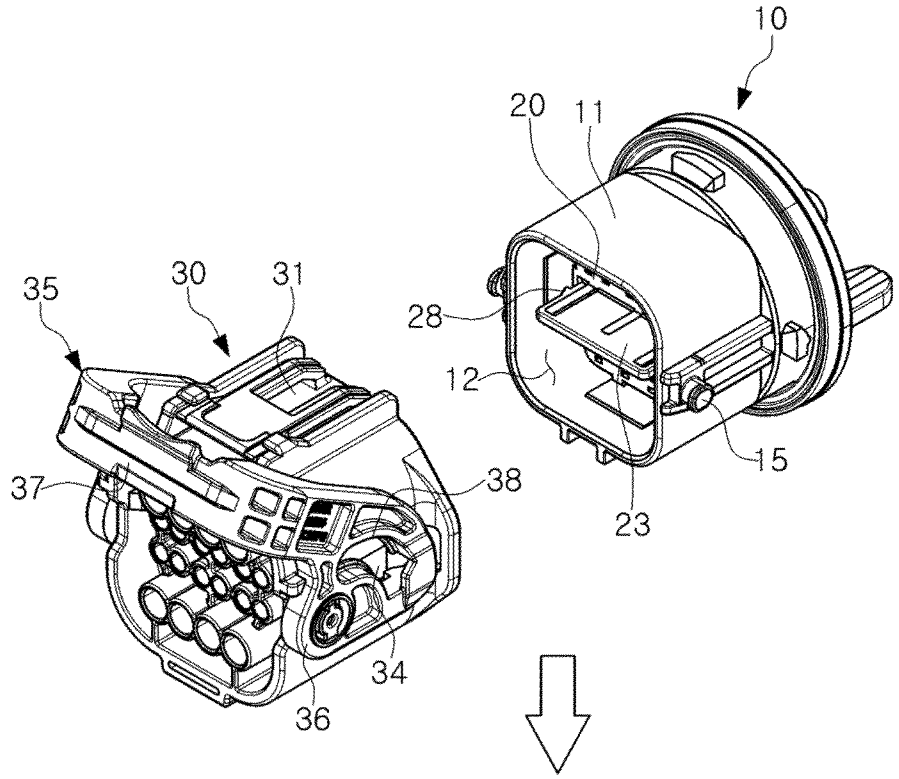
FIGS. 1A and 1B are perspective views illustrating a first connector and a second connector separated from each other in a connector assembly according to some embodiments.

Hereinafter, the present invention is explained in detail through exemplary drawings. In adding reference numerals to components of each drawing, it should be noted that the same components have the same numerals as much as possible even if they are displayed on different drawings.

Figure 1B:
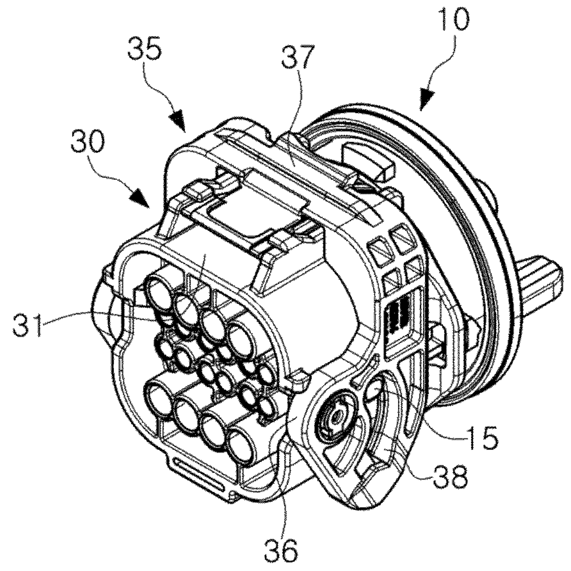
Figure 2:
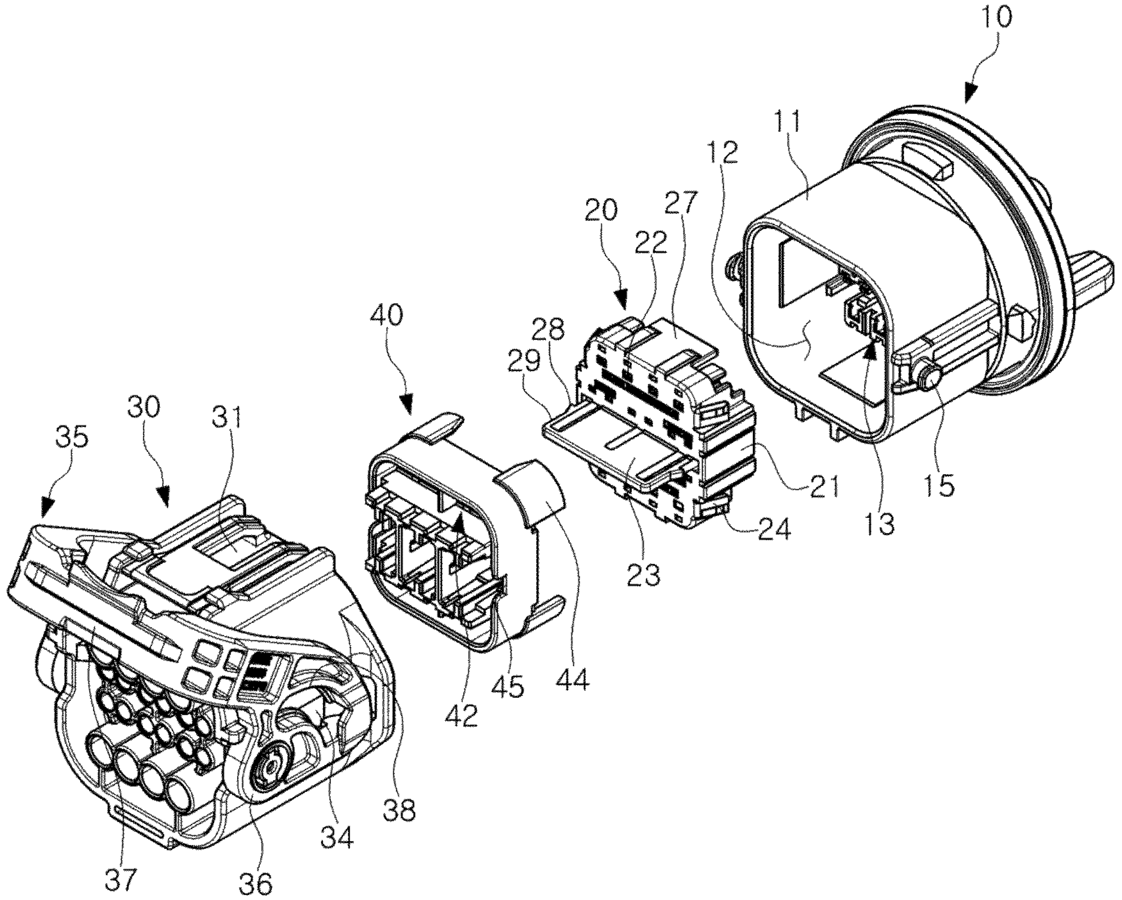
FIG. 2 is an exploded perspective view of FIGS. 1A and 1B.
Figure 3:
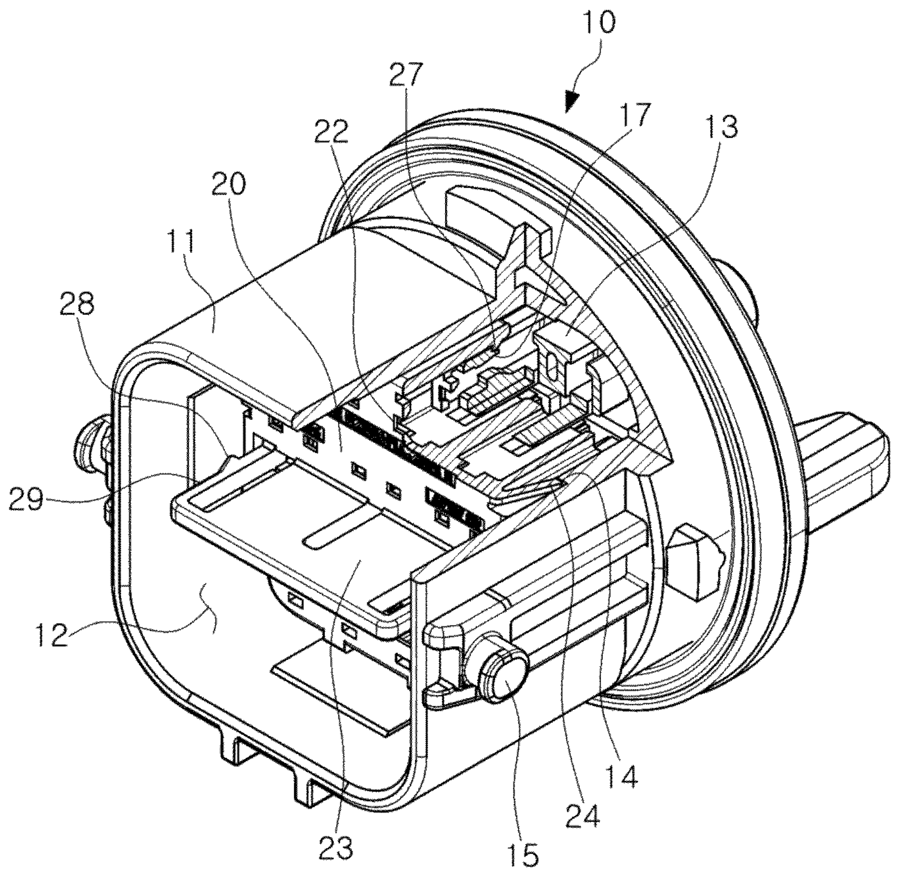
FIG. 3 is a partially cut-away perspective view illustrating a state in which the moving plate is in a temporary coupling position within the first connector.

FIGS. 1A and 1B are perspective views illustrating a first connector and a second connector separated from each other in a connector assembly according to an embodiment of the present invention, and FIG. 2 is an exploded perspective view of FIGS. 1A and 1B. FIG. 3 is a partially cut-away perspective view illustrating a state in which the moving plate is in a temporary coupling position within the first connector.

A connector assembly according to an embodiment of the present invention may include a first connector 10, a moving plate 20 and a second connector 30.

The first housing 11 defines an outer appearance and skeleton of the first connector 10. The first housing may be made of an insulating material and may be formed of a substantially cylindrical member with one side open and the other side closed. Accordingly, a coupling space 12 may be formed inside the first connector, that is, inside the first housing.

A part of the holder 40 constituting the second connector 30 may be inserted into the coupling space 12. In addition, a plurality of first terminals (not shown) of the first connector 10 may be disposed at predetermined intervals in the coupling space while being protruded. A portion of the first terminals may be located in a terminal seating portion 13 formed to pass through the closed surface of the first housing 11 and may be installed with an end protruding into the coupling space.

The coupling space 12 is divided into an inner surface and a closed surface of the first housing 11, and step portions 14 may be formed on inner surfaces of sidewalls of the first housing facing each other. Guide projections 15 may be formed on outer surfaces of sidewalls of the first housing facing each other.

In addition, a first locking portion 17 may protrude into the coupling space 12 in a substantially plate shape on the closed surface of the first housing 11. The first locking portion serves to restrict the moving plate 20 from coming out of the first connector 10, that is, the first housing. In other words, the first locking portion prevents the moving plate from coming out of the first housing at the temporary coupling position.

The moving plate 20 may be formed of a substantially rectangular plate member having a predetermined thickness. The moving plate may be made to have a shape corresponding to the cross-sectional shape of the coupling space 12 in the first housing 11. For example, the moving plate may have a plurality of side surfaces 21 formed along its edge.

A plurality of terminal holes 22 may be bored in the moving plate 20. Each terminal hole may be formed in a position corresponding to each of the plurality of first terminals of the first connector 10.

In the moving plate 20, a substantially plate-shaped first hook 27 may be formed on one of the plurality of side surfaces 21 in a cantilever shape capable of elastic deformation. The first hook may be formed to protrude toward one side of the moving plate, for example, toward the closed surface of the first housing 11.

The first hook 27 may be locked and fixed to the first locking portion 17 of the first housing 11. In this manner, the moving plate 20 can be restricted so that it does not escape from the first connector 10, that is, the first housing 11 at the temporary coupling position.

A guide protrusion plate 23 may protrude from the other side of the moving plate 20. The guide protrusion plate may be positioned to be substantially perpendicular to the moving plate and may have a rectangular plate shape as a whole.

Support arms 29 and second hooks 28 may be provided on both side end surfaces of the guide protrusion plate 23, respectively. One end of the support arm may be connected to an edge of the guide projection plate, and the other end of the support arm may be connected to the middle of the lateral end face of the guide projection plate. The second hook may be integrally formed to be supported by the support arm.

The support arm 29 may be formed of a material and a shape having predetermined elasticity so as to be deformable in the lateral direction of the guide protrusion plate 23. Accordingly, the position of the second hook 28 may be changed by elastic deformation of the support arm.

The moving plate 20 is positioned within the coupling space 12 of the first connector 10 to serve to maintain an interval between the plurality of first terminals and to prevent deformation of the first terminals due to external force. In particular, the moving plate may move between the temporary coupling position and the fully coupled position within the coupling space of the first connector when the first connector 10 and the second connector 30 are coupled or separated.

Here, the temporary coupling position is a position where the moving plate 20 is adjacent to the end of the first terminal. The fully coupled position is a position where the first connector 10 and the second connector 30 are completely coupled and the moving plate contacts the closed surface of the coupling space 12 or the position where the moving plate is closest to the closed surface.

In the connector assembly according to an embodiment of the present invention, hinge portions 24 which are rotatable at a predetermined angle may be formed on opposite sides among the plurality of side surfaces 21 of the moving plate 20. One side of the hinge portion is connected to the side surface of the moving plate so that rotation by elasticity is possible. Due thereto, the other end of the hinge portion can be caught or released from the step portion 14 on the inner surface of the first connector 10, that is, the inner surface of the first housing 11.

The hinge portions 24 serve to regulate the insertion of the moving plate 20 deep into the first connector 10, that is, the first housing 11, by an external force other than the force applied by the second connector 30. In other words, the hinge portions prevent the moving plate from being escaped from the temporary coupling position by undesired external force and prevent the moving plate from being moved toward the closed surface of the first housing.

Specifically, at the temporary coupling position of the moving plate 20, the hinge portions 24 spread with respect to the side surface 21 of the moving plate by its own elasticity. In this way, the hinge portions can be locked and fixed to the step portion 14 in the inner surface of the first housing 11.

At this time, when an external force other than the force by the second connector 30, that is, undesired external force is applied to the moving plate 20, due to the hooking and fixing by the hinge portions 24, the moving plate stays in place in the temporary coupling position within the first connector 10 and cannot be moved.

In the connector assembly according to an embodiment of the present invention, when the moving plate 20 is placed in the temporary coupling position within the first connector 10, as illustrated in FIG. 3, in addition to the hooking of the hinge portions 24 to the step portion 14 of the first connector, the first hook 27 of the moving plate is locked to the first locking portion 17 of the first connector, so that the moving plate cannot be moved in either direction.

Therefore, in the connector assembly according to an embodiment of the present invention, when undesired external force is applied to the moving plate 20, the moving plate can be reliably maintained in the temporary coupling position.

Figure 4:
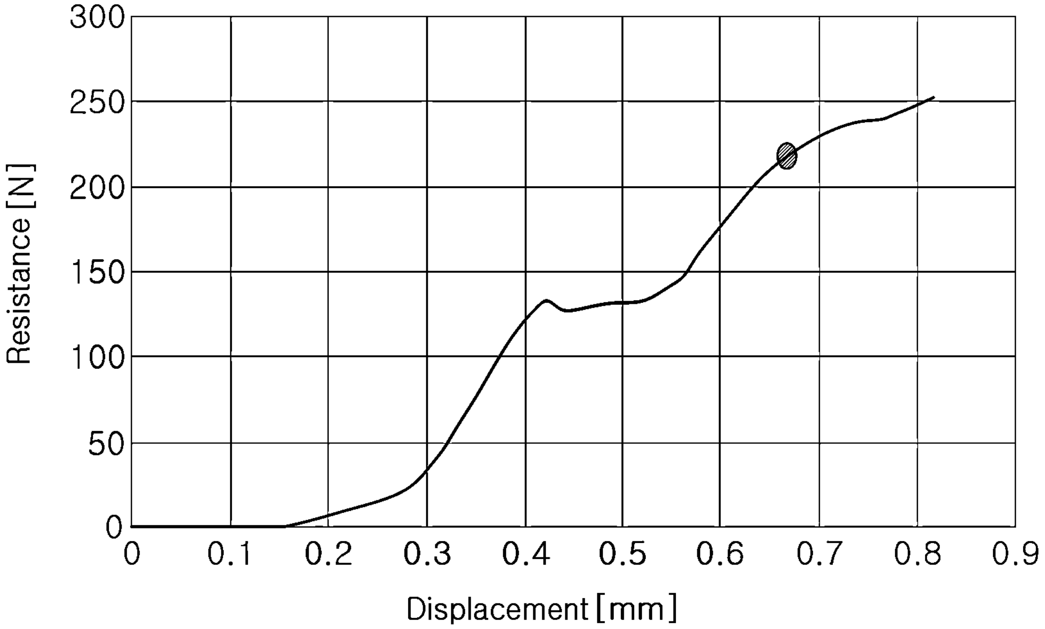
FIG. 4 is a graph illustrating the result of evaluating force-displacement for the moving plate of the connector assembly according to an embodiment of the present invention.

FIG. 4 is a graph illustrating the result of evaluating force-displacement for the moving plate of the connector assembly according to an embodiment of the present invention.

Since the hinge portions 24 exist in the moving plate 20, when the moving plate is placed in the temporary coupling position within the first connector 10, the hinge portions can be locked and fixed to the step portion 14 of the first connector. In this state, when an external force is applied to the moving plate without rotation of the hinge portion, the end portion of the hinge portion may support such an external force. Thus, the moving plate is not moved by undesired external force.

Typically, an external force that is randomly or accidentally applied before coupling the first connector and the second connector may have a magnitude of about 50 N or less. As illustrated in FIG. 4, it can be seen that the moving plate 20 of the connector assembly according to an embodiment of the present invention can withstand a force of about 217 N by the hinge portion 24.

In this way, the moving plate 20, to which the hinge portion 24 is applied, suppresses exposure of the terminals of the first connector as much as possible before coupling the first connector 10 and the second connector 30, and even if undesired external force is applied, it is possible to obtain a structural advantage of protecting the terminals against deformation or damage by being maintained in the temporary coupling position.

Referring again to FIGS. 1 and 2, the second connector 30 may be coupled to one side of the first connector 10, for example, to an open surface of the first housing 11.

The second connector 30 includes a second housing 31 having an accommodating space 32 therein, a plurality of second terminals (not shown) inserted into one side of the second housing, and a holder 40 inserted into the other side of the second housing and coupled to the second housing within the accommodating space.

The second housing 31 defines an external appearance and skeleton of the second connector 30. The second housing may be formed of an insulating material and may be formed of a substantially cylindrical member with one side open and the other side closed. Accordingly, the accommodating space 32 may be formed inside the second connector, that is, inside the second housing.

In the accommodating space 32, the holder 40 constituting the second connector 30 may be inserted and coupled. In addition, a terminal accommodating portion 33 for installing a plurality of second terminals of the second connector is provided in the accommodating space, and the plurality of second terminals may be disposed at predetermined intervals in the terminal accommodating portion.

Additionally, a lever 35 may be installed outside the second housing. The lever serves as a lever when the first connector 10 and the second connector 30 are coupled or separated, so that the first connector and the second connector can be coupled or separated with a relatively small force.

The lever 35 is rotatably installed on the outer surface of the second housing 31 and may be configured by connecting the interlocking plates 36 facing each other with a handle 37. An interlocking channel 38 may be formed on both interlocking plates, and a guide projection 15 of the first housing 11 is positioned in the interlocking channel to relatively move within the interlocking channel. One end of the interlocking channel may be opened to allow the guide protrusion to enter.

In addition, a guide slit 34 for insertion and movement of the guide projection 15 may be formed on the outer surface of the second housing 31 at a predetermined length. The guide slit 34 of the second housing and the interlocking channel 38 of the lever 35 may cross and communicate with each other.

For example, after the guide projection 15 of the first housing 1 is inserted into the guide slit 34 of the second housing 31, in a state in which it moves within the guide slit for a certain distance and enters the interlocking channel 38 of the lever 35, when the lever, that is, the interlocking plate 36 rotates in a first direction (for example, clockwise in FIGS. 1A and 1B), the guide protrusion may move within the guide slit along the trajectory of the interlocking channel.

Accordingly, the first connector and the second connector may be coupled while the second connector 30 is pulled toward the first connector 10.

On the other hand, when the lever 35, that is, the interlocking plate 36 is rotated in the second direction (for example, counterclockwise in FIGS. 1A and 1B), the guide projection 15 can be moved in an opposite direction within the guide slit 34 along the trajectory of the interlocking channel 38.

Accordingly, the first connector 10 and the second connector 30 become separable while being uncoupled.

The holder 40 may be formed of a substantially rectangular plate member having a predetermined thickness. The holder may be made to have a shape corresponding to the cross-sectional shape of the accommodating space 32 in the second housing 31. For example, the holder may be formed with a plurality of side surfaces 41 along its edge.

Fastening grooves 45 may be formed on opposite side surfaces among the plurality of side surfaces 41 of the holder 40, and the fastening grooves are press-fitted or hook-fixed with fastening protrusions (not shown) provided in the second housing 31, whereby the holder can be seated inside the second housing.

A plurality of terminal holes 42 may be bored in the holder 40. Each terminal hole may be formed at a position corresponding to each of the plurality of second terminals of the second connector 30.

The holder 40 may be formed to have a shape and size corresponding to that of the moving plate 20. A guide insertion hole 43 for inserting the guide protrusion plate 23 of the moving plate may be formed on one side of the holder that comes into contact with the moving plate.

A second locking portion 48 may be formed on the inner surface of the guide insertion hole 43 to protrude into the guide insertion hole. The second locking portion 48 may be locked and fixed to the second hook 28 of the moving plate 20. Accordingly, when the second connector 30 is separated from the first connector 10, the moving plate 20 can be moved along the holder 40 from the fully coupled position to the temporary coupling position.

In addition, on one side of the holder 40, a push plate 44 protruding outward from the side surface and extending in the thickness direction of the holder may be formed. The inner surface of the push plate may be shape-fitted with a part of the side surface of the moving plate 20. For example, when the push plate is formed at each of the four corners of the holder, the inner surface of the push plate may be shape-fitted with the corner of the moving plate.

Furthermore, the free end of the push plate 44 extending in the thickness direction of the holder 40 may contact the hinge portion 24 of the moving plate 20, and as a result, as the holder and the moving plate are closer, the hinge portion is folded to the side of the plate, whereas as the holder and the moving plate move away from each other, the hinge portion can be spread with respect to the side of the moving plate.

The holder 40 constructed and arranged as described above serves to reinforce the coupling between the second housing and the second terminal by supporting and fixing the second terminal installed in the second housing 31, and prevent the second terminal from leaving the second housing.

In addition, the holder 40 coupled to the inside of the second housing 31 is inserted into the coupling space 12 of the first housing 11 when the first connector 10 and the second connector 30 are coupled. Thus, the holder may be interposed between the first housing and the second housing. At this time, the open end of the first housing may be inserted between the inner surface of the second housing and the side surface 41 of the holder.

As the first connector 10 is inserted into the second connector 30, the guide protrusion plate 23 of the moving plate 20 penetrates the holder 40, and the push plate 44 of the holder is sandwiched between the inner surface of the first housing 11 and the side surface 21 of the moving plate, while the free end of the push plate can contact the hinge portion 24 of the moving plate to rotate the hinge portion.

In addition, as the push plate 44 of the holder 40 is sandwiched between the inner surface of the first housing 11 and the side surface 21 of the moving plate 20, the coupling between the holder and the first connector 10, that is, between the holder and the first housing and between the holder and the moving plate can be stably achieved.

Moreover, the holder 40 can be driven such that the moving plate 20 moves between the temporary coupling position and the fully coupled position in the coupling space 12 of the first housing 11 when the first connector 10 and the second connector 30 are coupled and separated. The driving force for this may be transmitted from the force that rotates the lever 35.

Therefore, the connector assembly according to an embodiment of the present invention has the advantage of being able to be simply configured without a separate component for the operation of the moving plate 20.

Hereinafter, the operation of the connector assembly according to an embodiment of the present invention, in particular, the process of coupling and separation thereof is described.

FIGS. 5A to 7B are views illustrating a process in which the moving plate is moved from the temporary coupling position to a fully coupled position when coupling the first connector and the second connector of the connector assembly according to an embodiment of the present invention.

Figure 5A:
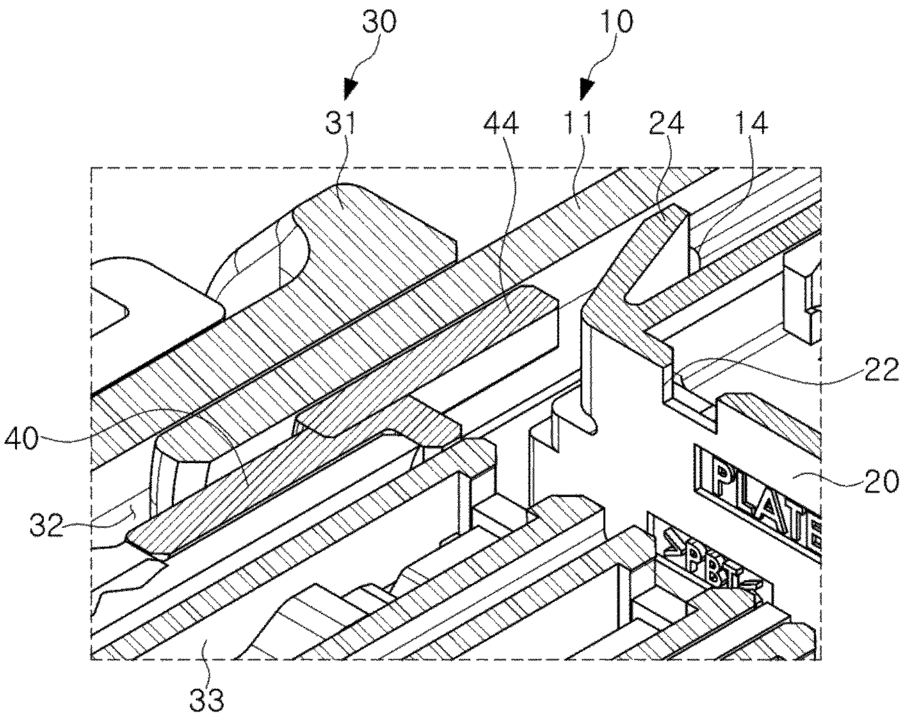
FIGS. 5A to 7B are views illustrating a process in which the moving plate is moved from the temporary coupling position to a fully coupled position when coupling the first connector and the second connector of the connector assembly according to an embodiment of the present invention.
Figure 5B:
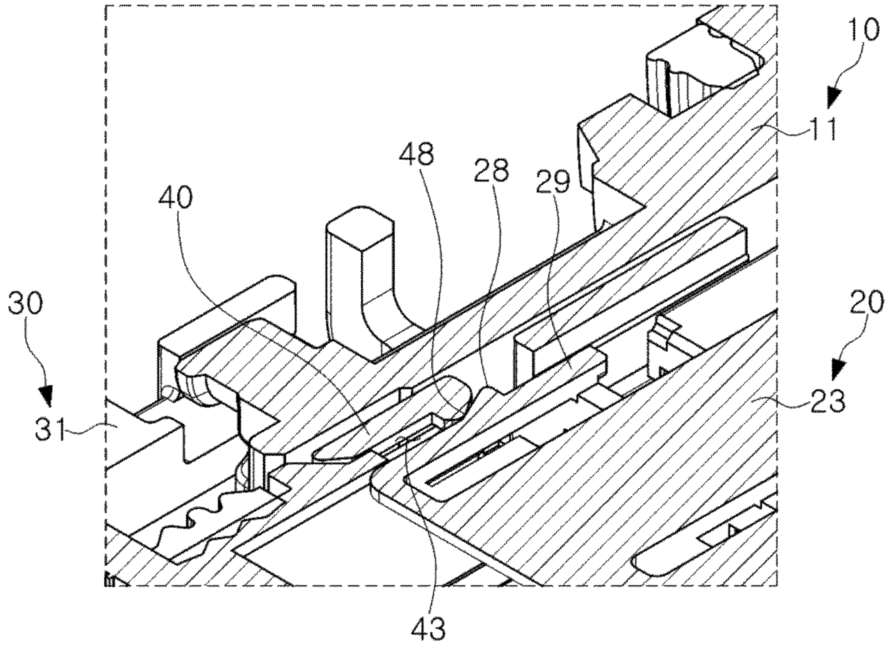

First, the state illustrated in FIGS. 5A and 5B is a state in which the lever 35 is tilted and the first connector 10 and the second connector 30 are not electrically connected. Further, this state is simply a state in which the first connector is inserted into the second connector, and the moving plate 20 is held in the temporary coupling position within the first housing 11.

It can be seen that the hinge portion 24 of the moving plate 20 is locked and fixed to the step portion 14 of the first housing 11. Thus, the moving plate is not moved by undesired external force.

Figure 6A:
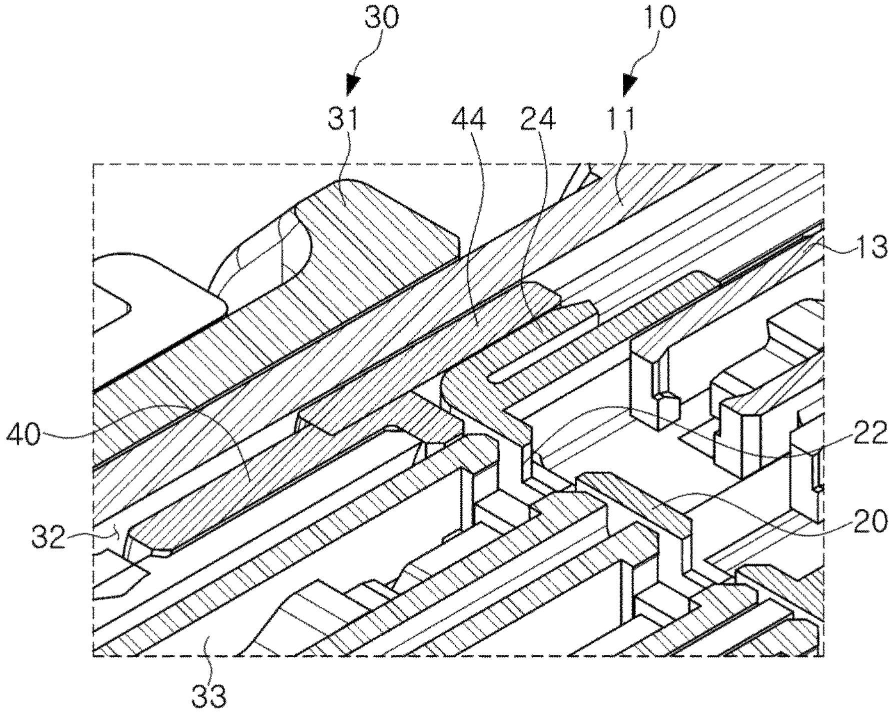
Figure 6B:
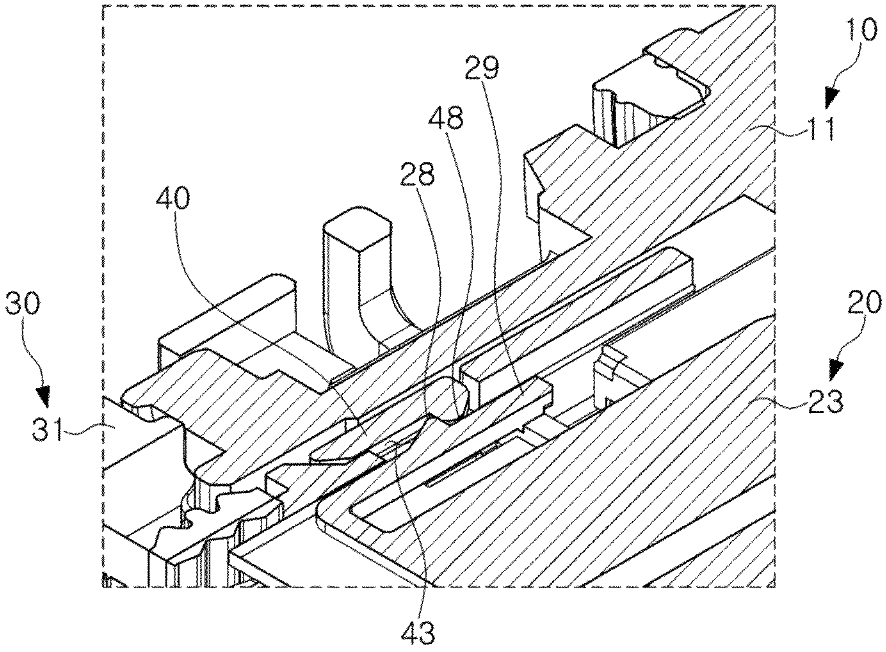

In this state, when the first connector 10 is further inserted into the second connector 30 by a predetermined distance, as illustrated in FIGS. 6A and 6B, the guide protrusion plate 23 of the moving plate 20 passes through the holder 40 of the second connector via the guide insertion hole, and the second locking portion 48 in the guide insertion hole can be caught on the second hook 28 of the moving plate.

In addition, while the push plate 44 of the holder 40 is inserted between the inner surface of the first housing 11 and the side surface of the moving plate 20, the hinge portion 24 can be rotated. Thus, the hinge portion can be folded to the side surface 21 of the moving plate and released from the step portion 14 on the inner surface of the first housing.

Due thereto, the moving plate 20 can be allowed to move from the temporary coupling position toward the closed surface of the first housing 11.

For example, when the lever 35 is rotated in the first direction, the guide projection 15 of the first housing 11 can be moved within the guide slit 34 of the second housing 31 along the trajectory of the interlocking channel 38 in the interlocking plate 36 of the lever.

According to this relative movement, the first connector 10 and the second connector 30 may be coupled while the first connector and the second connector are pulled toward each other.

When the first connector 10 and the second connector 30 are pulled towards each other, the holder 40 in the second housing 31 comes into contact with the moving plate 20, and then the moving plate is pushed toward the closed surface within the coupling space 12 of the first housing 11. Accordingly, the moving plate can be moved from the temporary coupling position to the fully coupled position.

Figure 7A:
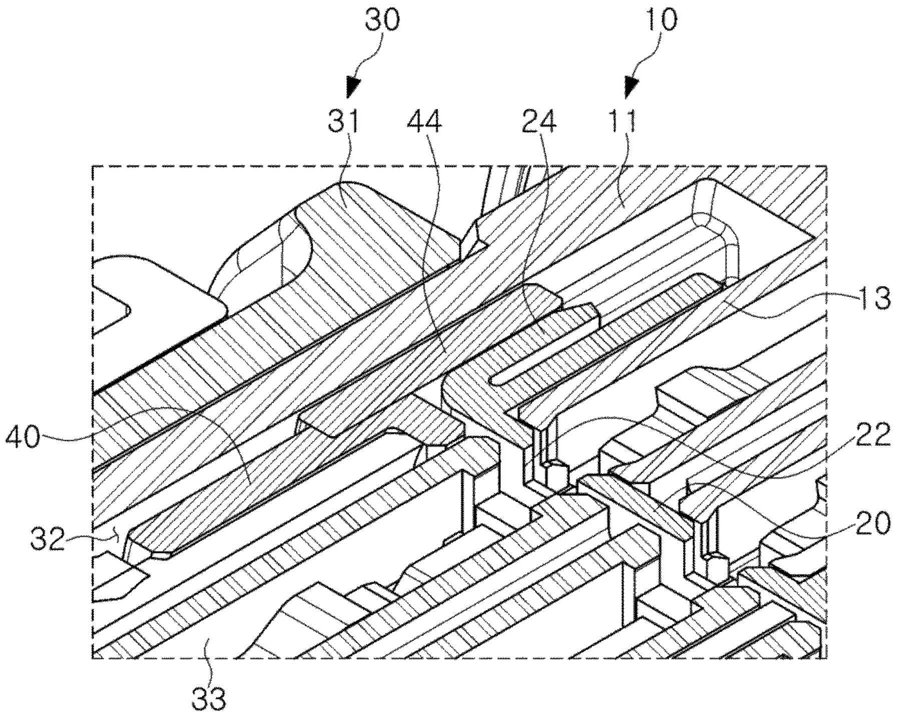
Figure 7B:
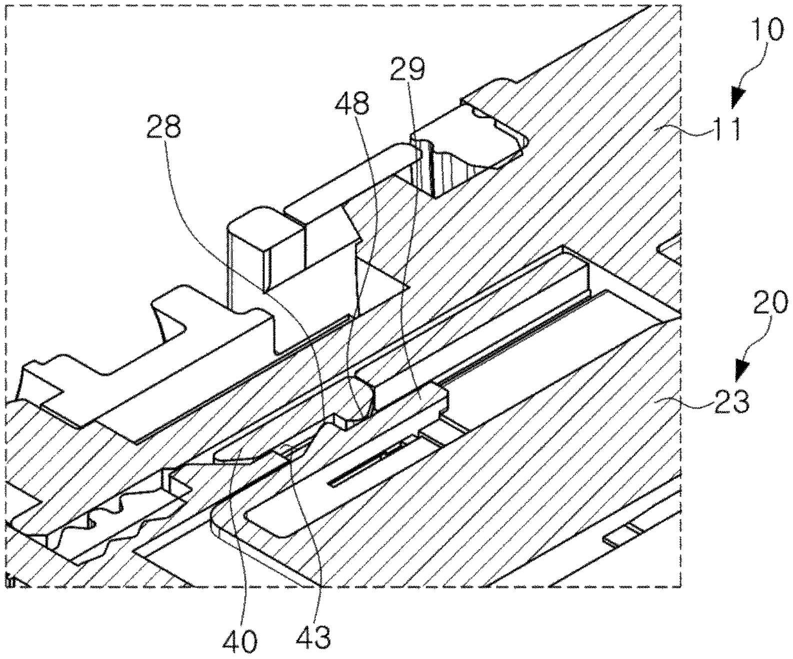

The state illustrated in FIGS. 7A and 7B is a state in which the lever 35 is fully rotated and erected, and the first connector 10 and the second connector 30 are completely coupled and electrically connected. Also, in this state, the moving plate 20 has been moved to the fully coupled position within the first housing 11.

It can be seen that the moving plate 20 is deeply inserted toward the closed surface in the first housing 11 with the unlocked hinge portion 24 folded. Therefore, the moving plate with the hinge portion can be selectively moved only by the force applied by the holder 40 with the push plate 44.

FIGS. 8A to 11B are views illustrating a process in which the moving plate is moved from the fully coupled position to the temporary coupling position when the first connector and the second connector of the connector assembly are separated according to an embodiment of the present invention.

Figure 8A:
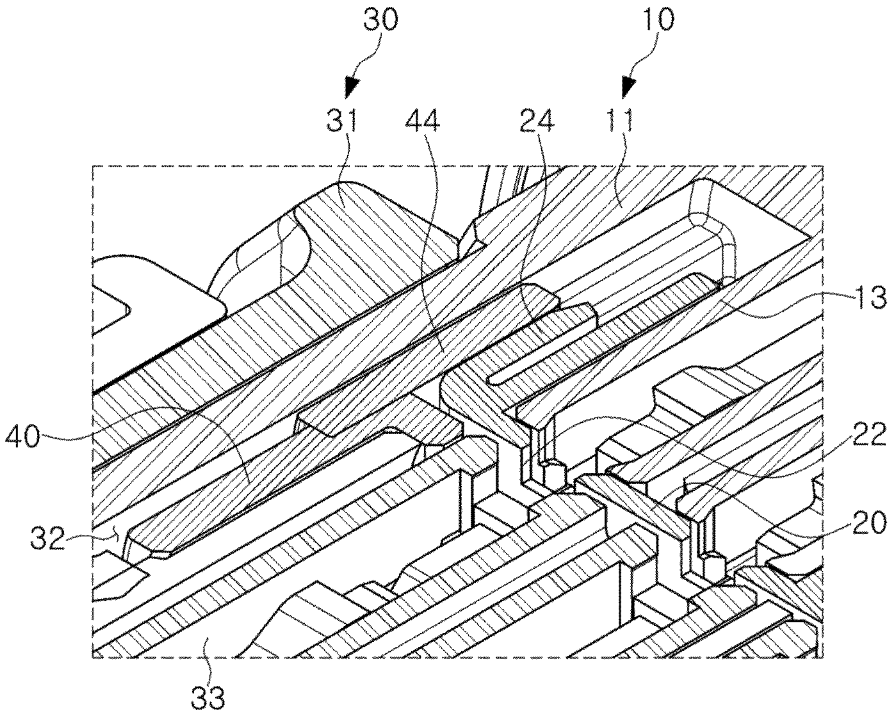
FIGS. 8A to 11B are views illustrating a process in which the moving plate is moved from the fully coupled position to the temporary coupling position when the first connector and the second connector of the connector assembly are separated according to an embodiment of the present invention.
Figure 8B:
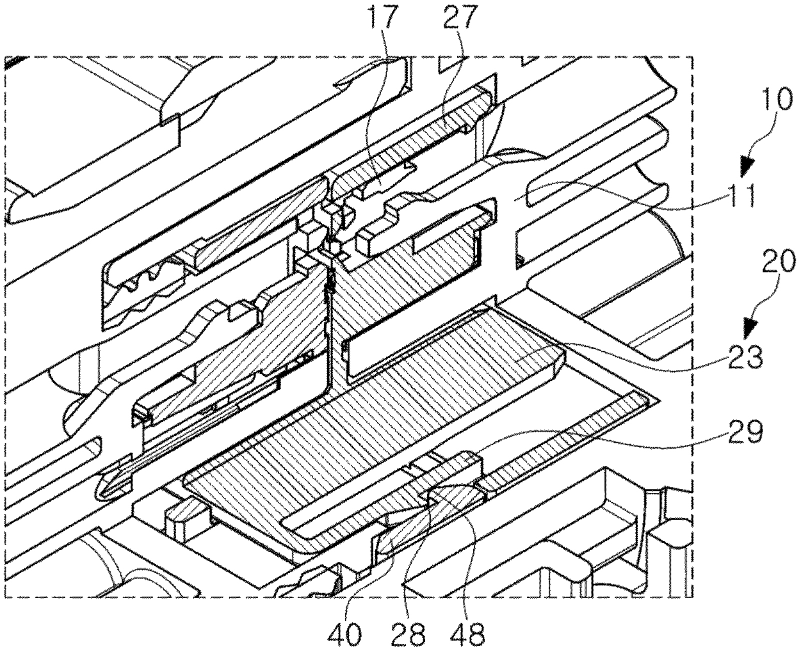

The state illustrated in FIGS. 8A and 8B is the same as the state illustrated in FIGS. 7A and 7B described above. In this state, for example, when the lever 35 is rotated in the second direction to separate the first connector 10 and the second connector 30, the guide projection 15 of the first housing 11 can be moved in the opposite direction to the previous one in the guide slit 34 of the second housing 31 along the trajectory of the interlocking channel 38 in the interlocking plate 36 of the lever.

According to this relative movement, the first connector 10 and the second connector 30 are spaced apart from each other so that the first connector and the second connector can be separated.

Figure 9A:
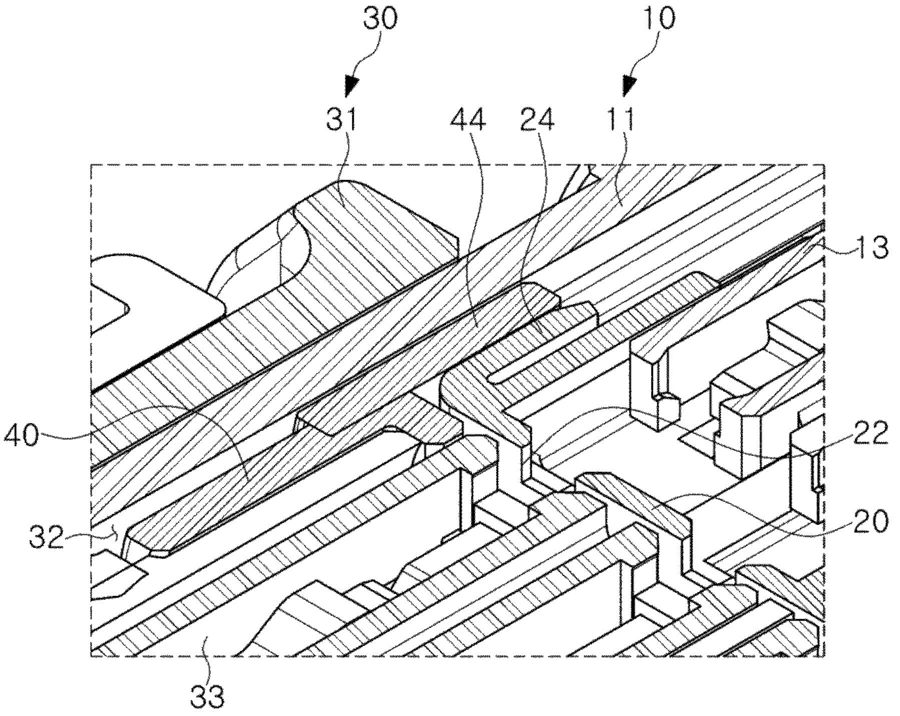
Figure 9B:
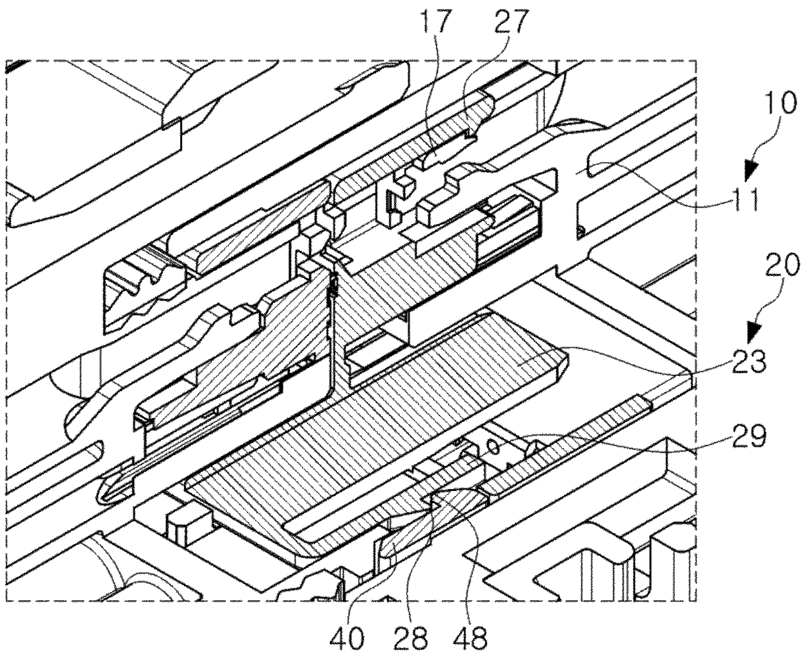

When the first connector 10 and the second connector 30 are spaced apart from each other, the second locking portion 48 in the guide insertion hole 43 of the holder 40 can be locked and fixed to the second hook 28 of the moving plate 20. Accordingly, as illustrated in FIGS. 9A and 9B, the moving plate may relatively move within the first housing 11 along the holder from the fully coupled position to the temporary coupling position.

Figure 10A:
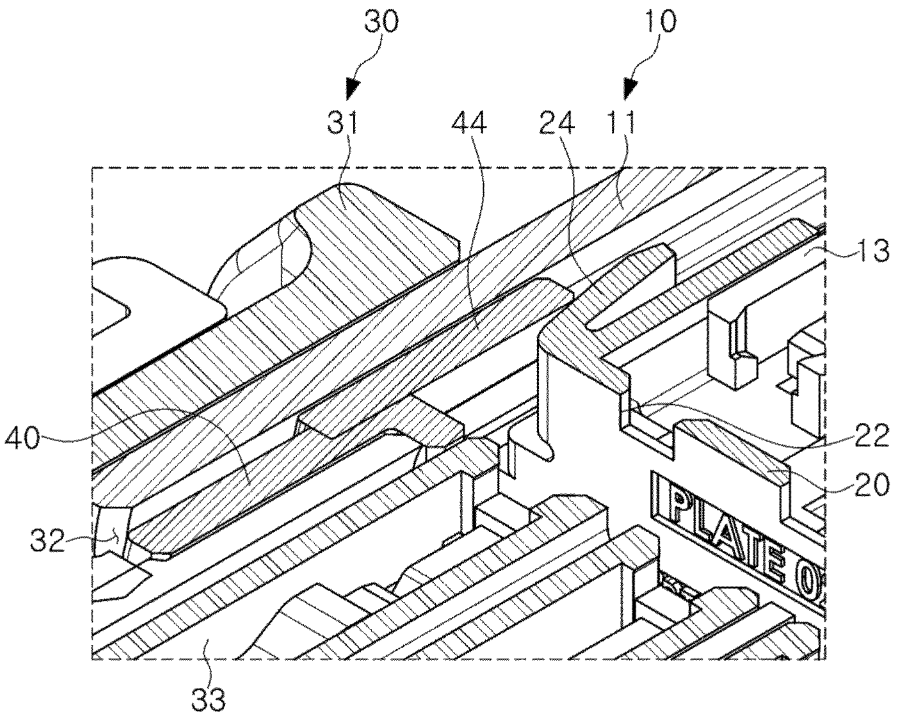
Figure 10B:
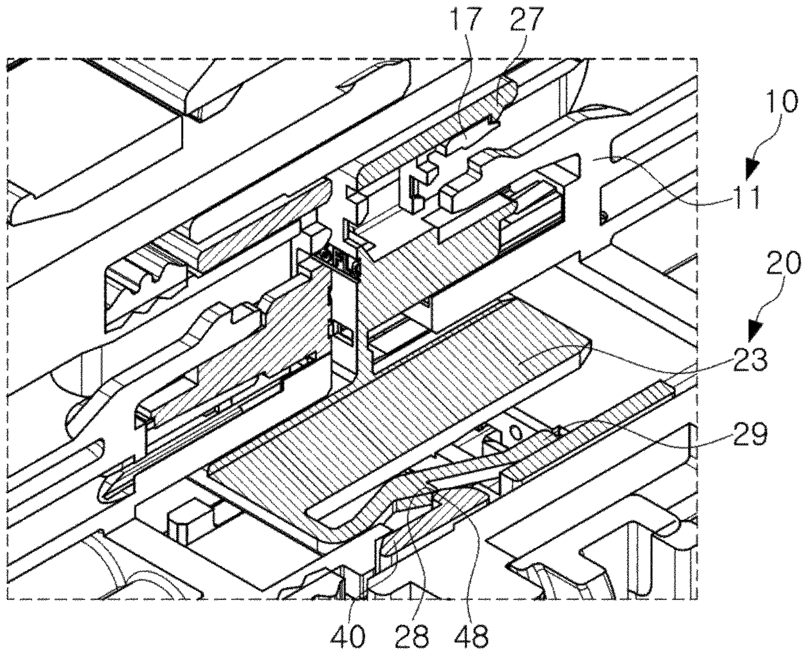

When the moving plate 20 reaches the temporary coupling position, as illustrated in FIGS. 10A and 10B, the first hook 27 of the moving plate may be locked and fixed to the first locking portion 17 of the first housing 11. In this way, the moving plate can be held in the temporary coupling position while being restricted from moving relative to the first housing 11 any longer.

At this time, when a force greater than the force for hooking and fixing the second locking portion 48 of the holder 40 and the second hook 28 of the moving plate 20 is applied to the second connector 30 and the first connector 30 via the lever, whereby the distance between these connectors is further increased, as illustrated in FIGS. 10A and 10B, the hooking of the second hook can be released from the second locking portion while changing its position by the elastic deformation of the support arm 29.

In doing so, the connection between the moving plate 20 and the holder 40 is released and the moving plate and the holder can be separated from each other. As the distance between the moving plate and the holder increases, the hinge portion 24 can be spread with respect to the side surface 21 of the moving plate. In FIGS. 10A and 10B, a state immediately before the hinge portion of the moving plate is locked and fixed to the step portion 14 of the first housing 10 can be seen.

Figure 11A:
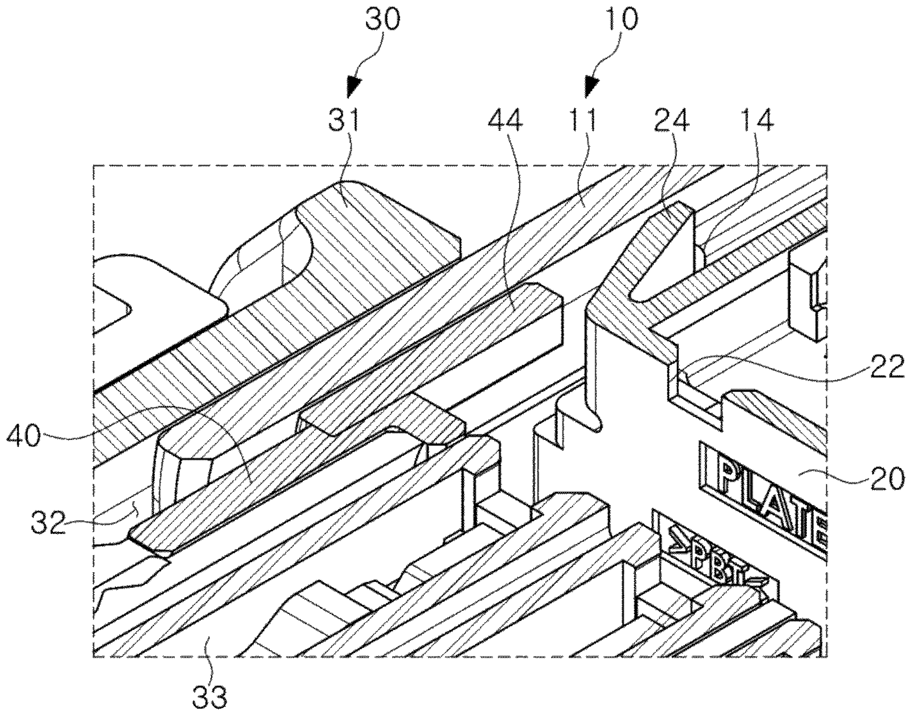
Figure 11B:
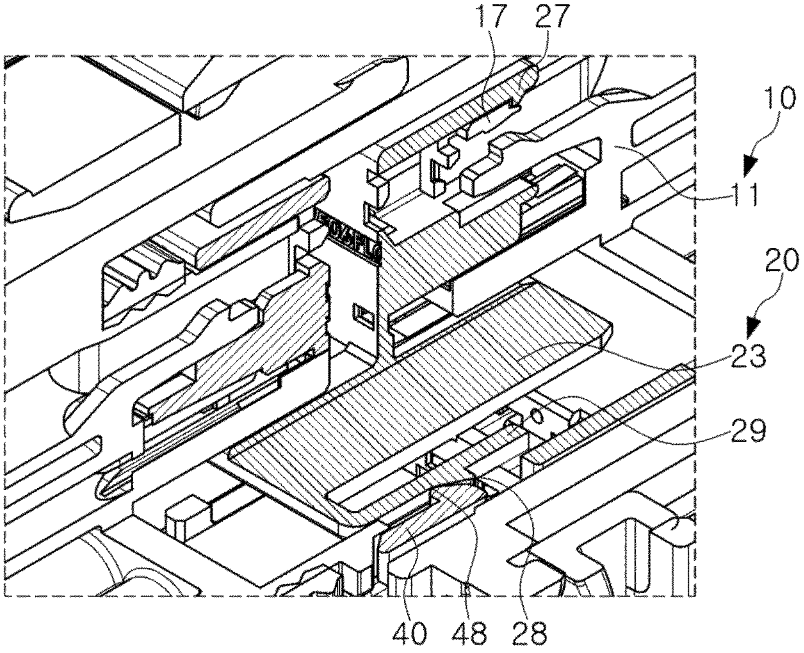

The state illustrated in FIGS. 11A and 11B is the same as the state illustrated in FIGS. 5A and 5B described above. In other words, the first connector 10 and the second connector 30 are disconnected electrically, and the first connector is simply inserted into the second connector.

It can be seen that in addition to the fact that the hinge portion 24 of the moving plate 20 is again locked and fixed to the step portion 14 of the first housing 11, the first hook 27 of the moving plate is locked and fixed to the first locking portion 17 of the first housing. In this way, the moving plate can be held in the temporary coupling position without being moved in either direction.

As described above, according to one embodiment of the present invention, the connector assembly can be simply configured without separate parts for the operation of the moving plate, and the moving plate can be reliably maintained in the temporary coupling position when undesired external force is applied.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment (s), but that the invention will include all embodiments falling within the scope of the appended claims.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

The invention claimed is:

1. A connector assembly, comprising:

a first connector having a coupling space formed therein and having a plurality of first terminals disposed in the coupling space;

a moving plate movably installed in the coupling space and having a plurality of terminal holes through which the plurality of first terminals passes; and a second connector coupled to one side of the first connector and moving the moving plate in the coupling space, wherein a step portion is formed on an inner surface of the first connector, and wherein a hinge portion is formed on a side surface of the moving plate to rotate at a predetermined angle, and an end of the hinge portion is locked or released from the step portion.

2. The connector assembly of claim 1, wherein the second connector includes a second housing having an accommodating space formed therein, a plurality of second terminals inserted into the second housing, and a holder coupled to the second housing in the accommodating space and having a terminal hole through which the second terminal passes, wherein a push plate extending in a thickness direction of the holder is formed on one side of the holder, and wherein when the first connector and the second connector are coupled, a free end of the push plate comes into contact with the hinge portion to rotate the hinge portion.

3. The connector assembly of claim 2, wherein the first connector includes a first housing, wherein the first housing has the coupling space formed therein, wherein the first housing includes a first locking portion formed to protrude into the coupling space, and wherein a first hook is formed to protrude to one side of the moving plate on another side surface of the moving plate, and the first hook is capable of being locked in the first locking portion.

4. The connector assembly of claim 3, wherein a guide protrusion plate is formed to protrude on another side of the moving plate, wherein the guide protrusion plate includes a support arm connected to a lateral end face thereof, and a second hook integrally formed with the support arm, wherein a guide insertion hole for inserting the guide protrusion plate is formed on one side of the holder, and wherein a second locking portion is formed to protrude into the guide insertion hole on the inner surface of the guide insertion hole, and the second locking portion is capable of being locked by the second hook.

5. The connector assembly of claim 4, wherein when the first connector and the second connector are coupled to each other, the hinge portion is released by the push plate and the holder comes into contact with the moving plate to drive the moving plate, so that the moving plate is moved from a temporary coupling position to a fully coupled position, and wherein when the first connector and the second connector are separated, the second hook is locked in the second locking portion so that the holder is connected to the moving plate to drive the moving plate, whereby the moving plate is moved from the fully coupled position to the temporary coupling position.

6. The connector assembly of claim 4, wherein when a force greater than the force for locking the second hook and the second locking portion is applied, the second hook is released from the second locking portion while a position is changed by an elastic deformation of the support arm, thereby allowing separation of the first connector and the second connector.

7. The connector assembly of claim 3, wherein a guide projection is formed on an outer surface of the first housing, and wherein a guide slit for insertion and movement of the guide projection is formed on an outer surface of the second housing with a predetermined length.

8. The connector assembly of claim 7, wherein a lever is installed outside the second housing, wherein the lever includes an interlocking plate rotatably installed on the outer surface of the second housing and having an interlocking channel formed therein, and a handle connected to the interlocking plate, and wherein the interlocking channel and the guide slit cross and communicate with each other, and the guide projection is moved in the guide slit along a trajectory of the interlocking channel.

* * * * *